United States Patent
Brandt

(10) Patent No.: US 6,522,383 B2
(45) Date of Patent: Feb. 18, 2003

(54) DISPLAY DEVICE WITH A LIQUID-CRYSTAL CELL

(75) Inventor: Peter Brandt, Aschaffenburg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/726,695

(22) Filed: Nov. 29, 2000

(65) Prior Publication Data
US 2001/0012090 A1 Aug. 9, 2001

(30) Foreign Application Priority Data
Dec. 3, 1999 (DE) .......................... 199 58 362

(51) Int. Cl.$^7$ ................................ G02F 1/13
(52) U.S. Cl. ............................................. 349/161
(58) Field of Search .................. 349/122, 161, 349/179, 96

(56) References Cited

U.S. PATENT DOCUMENTS

| | | | | |
|---|---|---|---|---|
| 4,121,568 A | * | 10/1978 | Olses | 126/271 |
| 4,904,850 A | * | 2/1990 | Claypool et al. | 219/548 |
| 5,064,697 A | * | 11/1991 | Takiguchi et al. | 4428/1 |
| 5,099,621 A | * | 3/1992 | Schackette et al. | 52/171 |
| 5,150,231 A | * | 9/1992 | Iwamoto et al. | 359/44 |
| 6,122,079 A | * | 9/2000 | Branca et al. | 359/15 |

FOREIGN PATENT DOCUMENTS

| | | | | |
|---|---|---|---|---|
| DE | 003437131 A1 | * | 4/1986 |
| JP | 2170119 | * | 6/1990 |
| JP | 402170119 A | * | 6/1990 |
| JP | 402170133 A | * | 6/1990 |
| JP | 403056926 A | * | 3/1991 |
| JP | 403290619 A | * | 12/1991 |
| JP | 404003026 A | * | 1/1992 |
| JP | 404070628 A | * | 3/1992 |

OTHER PUBLICATIONS

Fujikake et al.; "Video camara system using liquid crystal polarizing filter to reducing reflecting light"; IEEE Transaction on broadcasting, vol. 44, No. 4, pp. 419–426 (1998).*

McCartney et al.; "An arinc D–size liquid crystal display for aircraft primary flight instruments"; Digital Avionics Systems Conference, 13$^{th}$ DASC AIAA/IEEE pp. 620–625 (1994).*

* cited by examiner

Primary Examiner—James Dudek
Assistant Examiner—Hoan Nguyen
(74) Attorney, Agent, or Firm—Martin A. Farber

(57) ABSTRACT

In a display device with a liquid-crystal cell (1) with two supporting panels (2, 3) and a heating device (4) and at least one pole filter (6), the pole filter (6) is kept at a distance from the heating device (4) by a transparent insulating layer (7). This avoids inadmissibly high thermal loading of the pole filter (6).

10 Claims, 1 Drawing Sheet

DISPLAY DEVICE WITH A LIQUID-CRYSTAL CELL

FIELD AND BACKGROUND OF THE INVENTION

The invention relates to a display device, in particular in a motor vehicle, with a liquid-crystal cell which has a pole filter, a front supporting panel, facing a viewer, a rear supporting panel and a liquid-crystal substance arranged in a cell space between the supporting panels, and with a heating device for heating the liquid-crystal cell.

Display devices of the above type are frequently used, for example, in motor vehicles for different indications and are therefore generally known. At low temperatures, the liquid-crystal cell of the display device is undesirably slow to respond on account of the then high inertia of the liquid-crystal substance. As a result, it takes a long time before a change of the indication can be read from the display. Since, in winter, initially very low temperatures may prevail in motor vehicles after starting, it is necessary to heat the liquid-crystal cell. This currently takes place by a heating device having heating wires, the heating wires being attached on a pole filter of the liquid-crystal cell. However, pole filters assigned to the liquid-crystal cell are heat-sensitive, so that their service life is reduced greatly when they are exposed to higher temperatures by the heating device. Therefore, there is a conflict of aims. On the one hand, it is desired for a cold liquid-crystal cell to be heated up as quickly as possible, and a relatively great heating output is required for this purpose, on-the other hand the pole filters must not be exposed to high temperature loading.

SUMMARY OF THE INVENTION

The invention is therefore based on the problem of providing a liquid-crystal cell of the type stated at the beginning in such a way that it can be heated up as quickly as possible without inadmissibly high temperature loading of the pole filter occurring.

This problem is solved according to the invention by the heating device being arranged outside the cell space and between the pole filter and one of the supporting panels, and by the pole filter being separated from the heating device by means of a thermal insulating layer.

Such an insulating layer allows a significantly higher heating output of the heating device than in the case of heating devices which, in the previously known form, have direct contact with the pole filter, without the pole filter being exposed to undesirably strong thermal stress. As a result, rapid heating up of the liquid-crystal cell is possible, so that even after cold nights a rapid indication on a liquid-crystal display becomes possible. Thanks to the invention, the service life of the pole filter, and consequently of the display device, is increased significantly with respect to comparable liquid-crystal cells. This is of great significance in particular in the case of display devices installed in motor vehicles. Such display devices, which are for example a component part of an indicating instrument cluster or—fitted into the dashboard or the central console—of an information system, should not fail before the vehicle as a whole comes to the end of its service life, since they are very complicated to replace.

The utilization of the light emitted by an illuminating device for the liquid-crystal cell of the display device is particularly high if, according to an advantageous development of the invention, the insulating layer is transparent.

A fluid or a rigid body is conceivable for example as the insulating layer. The display device can, however, be produced at particularly low cost, and allows very effective thermal insulation of the pole filter with respect to the heating device, if the insulating layer is formed by a layer of air.

The heat-insulating layer of air or a space for the heat-insulating fluid is obtained in a particularly simple way if, according to another development of the invention, the pole filter is preferably mounted with a lateral frame on the heating device.

Alternatively, however, it is also possible for the insulating layer to be formed by a heat-insulating panel. On account of low production costs and simple handling, a glass or plastic panel is preferably appropriate here.

The heating device can be produced with the insulating layer as one component, and can consequently also be easily handled, if it is formed by an electrically conducting layer which faces the supporting panel, has an electrical resistance and on which the heat-insulating panel forming the insulating layer is formed. In the case of such an embodiment, liquid-crystal cells can without any problem be fitted with or without a heating device, which can be inserted as required. The heating of the liquid-crystal cell takes place in this case by the waste heat of the electrical resistance.

According to another development of the display device according to the invention, it is of particular advantage if the layer formed on the panel has a conductive polymer. As a result, the heating device can be produced in the particularly simple and low-cost way by means of the conductive plastic. The conductive polymer in this case makes high efficiency possible, as a result of uniform heat dissipation, without at the same time disturbing with any lasting effect the path of rays of the light passing through the liquid-crystal cell.

According to another advantageous development of the invention, just a small reduction in the light intensity, allowing a customary light source with low energy consumption to be used for illuminating the liquid-crystal cell, takes place if the conductive polymer has a light transmission of at least 90%.

If liquid-crystal cells are illuminated by means of transmitted light, a front pole filter and a rear pole filter are required. In such cases, it is advisable for both supporting panels each to have a pole filter, with the insulating layer interposed, for thermal isolation.

According to another advantageous development of the display device according to the invention, the latter has a DSTN (Double Super Twisted Nematic) cell, which has the liquid-crystal cell and a further liquid-crystal cell optically arranged in series with the liquid-crystal cell. In this case, the further liquid-crystal cell may be provided merely for color compensation as a passive cell, i.e. a cell which cannot be actively energized, or else be an active liquid-crystal cell which can be energized, for displaying information. With a DSTN cell, the display contrast can be improved considerably.

If the further liquid-crystal cell is to serve merely as a passive cell for color compensation and consequently for good, high-contrast readability even from great viewing angles, the display device according to the invention is advantageously further simplified if it has an FSTN (Foil Compensated Super Twisted Nematic) cell, which has the liquid-crystal cell and a color-compensating foil arranged optically in series with the liquid-crystal cell. This color-aberration-correcting compensating foil (also referred to as compensating film) may be arranged directly on the liquid-crystal cell or—without impairing its optical effect—at a distance from the liquid-crystal cell. This is advantageous in particular whenever the color-compensating foil is connected to the pole filter, forming a single component, consequently representing a pole filter with extended, color-compensating properties, and the heating device is in this way also to be arranged between this pole-filter color-compensating foil and one of the supporting panels of the liquid-crystal cell.

BRIEF DESCRIPTION OF THE DRAWING

The invention allows various embodiments. To illustrate its basic principle further, two of these are described below and represented in the figures of the drawing, in which.

DETAILED DESCRIPTION OF THE PREFERRED EMBODIMENT

Figure 1:
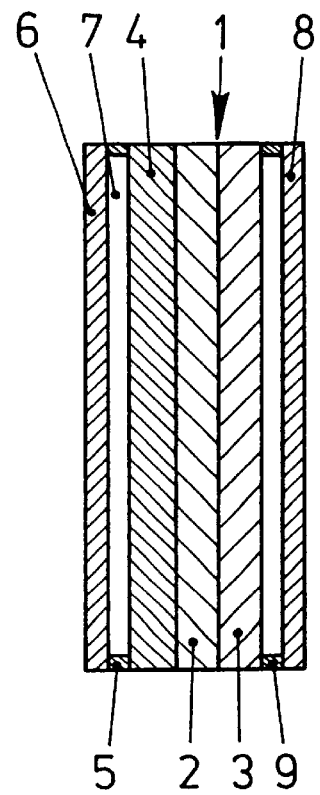
FIG. 1 shows a section through a first embodiment of a liquid-crystal cell of a display device according to the invention.

FIG. 1 shows a liquid-crystal cell 1, which has two customary supporting panels 2, 3, between which there is (not shown here) in an enclosed cell space a liquid-crystal substance which can be energized in a known way by means of electrodes arranged on the panels 2, 3. On the front supporting panel 2, facing a viewer, there rests a heating device 4, which may advantageously be an electrically conducting coating having an electrical resistance. A frame 5 mounted on the heating device 4 keeps a pole filter 6, serving as a front pole filter, at a distance from the heating device 4, so that between the heating device 4 and the pole filter 6 there is a thin, thermal insulating layer 7, which in this example is formed by a layer of air and prevents considerable heat from passing from the heating device 4 to the pole filter 6 in an undesirable way.

Likewise arranged on the rear side of the liquid-crystal cell 1 there is a pole filter 8, which is kept at a distance from the rear panel 3 by a frame 9. The pole filter 8 could, however, also bear directly against the rear supporting panel 3.

Figure 2:
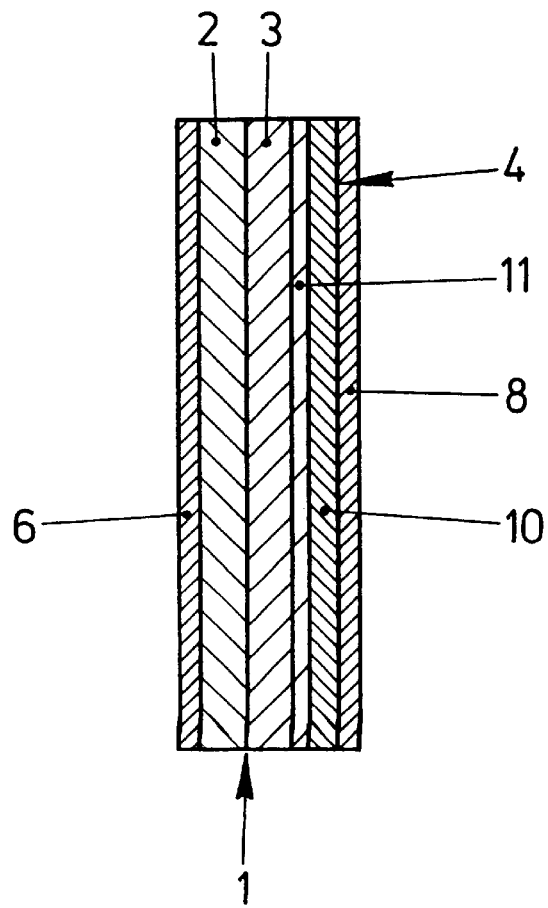
FIG. 2 shows a section through a second embodiment of a liquid-crystal cell according to the invention of a display device.

In the embodiment according to FIG. 2, provided as an insulating layer between the heating and the pole filter 8 there is a panel 10 of glass, which has on its side facing the rear supporting panel 3 an electrically conducting resistance layer 11, which forms the heating device 4. In this way, the pole filter 8 is likewise at a distance from the heating device 4 and is thermally insulated from it. In the embodiment shown in FIG. 2, the second pole filter 6 rests directly on the front supporting panel 2. Since the latter is kept at a distance from the heating device 4 by the panel 3, there is no inadmissibly high thermal loading of the front pole filter 6.

I claim:

1. A display device, in particular in a motor vehicle, comprising a liquid-crystal cell which has a polarization filter, a front supporting panel, facing a viewer, a rear supporting panel and a liquid-crystal substance arranged in a cell space between the supporting panels, and a heating device for heating the liquid-crystal cell, wherein the heating device is arranged outside the cell space and between the polarization filter and one of the supporting panels, wherein the polarization filter is separated from the heating device by a thermal insulating layer, and wherein the polarization filter is mounted with a lateral frame disposed between the heating device and the polarization filter.

2. The display device as claimed in claim 1, wherein said insulating layer is transparent.

3. The display device as claimed in claim 1, wherein the insulating layer is formed by a layer of air.

4. The display device as claimed in claim 1, wherein the insulating layer is formed by a heat-insulating panel.

5. The display device as claimed in claim 4, wherein said heating device is formed by an electrically conducting layer which faces the supporting panel, has an electrical resistance and on which the heat-insulating panel forming the insulating layer is formed.

6. The display device as claimed in claim 5, wherein said layer formed on the panel has a conductive polymer.

7. The display device as claimed in claim 6, wherein said conductive polymer has a light transmission of at least 90%.

8. The display device as claimed in claim 1, wherein both supporting panels each have a polarization filter, with the insulating layer interposed.

9. The display device as claimed in claim 1, which comprises a DSTN (Double Super Twisted Nematic) cell, which has the liquid-crystal cell and a further liquid-crystal cell optically arranged in series with the first mentioned liquid-crystal cell.

10. The display device as claimed in claim 1, which comprises an FSTN (Foil Compensated Super Twisted Nematic) cell, which has the liquid-crystal cell and a color-compensating foil arranged optically in series with the liquid-crystal cell.

* * * * *